Oct. 9, 1951 J. MERCIER 2,570,362
TELESCOPIC SHOCK ABSORBING STRUT
Filed Feb. 24, 1948 5 Sheets-Sheet 1

Fig. 1.

INVENTOR
JEAN MERCIER
By Adams & Bush
ATTORNEYS

Fig. 2.

Oct. 9, 1951   J. MERCIER   2,570,362
TELESCOPIC SHOCK ABSORBING STRUT
Filed Feb. 24, 1948   5 Sheets-Sheet 3

INVENTOR
JEAN MERCIER
BY Adams & Bush
ATTORNEYS

Fig. 4.

Patented Oct. 9, 1951

2,570,362

UNITED STATES PATENT OFFICE 2,570,362

TELESCOPIC SHOCK ABSORBING STRUT

Jean Mercier, Paris, France

Application February 24, 1948, Serial No. 10,504
In France May 18, 1946

Section 1, Public Law 690, August 8, 1946
Patent expires May 18, 1966

5 Claims. (Cl. 267—64)

The present invention relates to shock absorbers, more particularly to shock absorbing struts used in undercarriages of airplanes as landing gear. These shock absorbers, to meet the conditions required, must possess some special features. When the airplane lands, the shock absorber must be able to absorb the impact due to the shock of the landing. For that purpose, it must present a substantial resistance to the inward thrust of the movable member. On the other hand, after this impact has been absorbed, and while the airplane is rolling along on the ground, the shock absorber must be sufficiently responsive to absorb the shocks due to the roughness of the ground, without transmitting them to the airplane.

Numerous devices have heretofore been provided which allow the operating of the shock absorber under two different conditions. These prior systems, however, are rather complicated, and furthermore, do not satisfactorily meet the conditions which are encountered.

The purpose of the present invention is to avoid the drawbacks of prior devices, and to provide a suspension which will meet the required operating conditions.

The shock absorber according to the present invention is of the type including a variable volume chamber, a constant volume chamber, and means intended to establish and to close communication between these two chambers under determined conditions.

According to a first feature of the present invention, the means of communication include at least one passage closed by a check-valve arranged in such a way that its face opposite the face on which the overpressure is applied, is submitted first to the pressure of a calibrated spring, and second, to a variable pressure, means being provided to reduce this pressure while the airplane is rolling along the ground. This result is obtained by the fact that the check-valve is provided on a piston, the outer diameter of which is equal to, or in a given ratio with, the diameter of the section of the face of the check-valve submitted to the overpressure and which slides in a closed chamber communicating with the surrounding space only through a compensating opening of small section.

With such an arrangement, when the shock absorber receives the impact of landing, the check-valve opens itself for a pressure determined by the calibration of the spring added to the pressure existing above the piston integral with the check-valve and which is equal to the average pressure inwards existing from the chamber which opens the check-valve.

The check-valve is connected with its piston, preferably by a hollow rod, which can constitute by itself the above-mentioned piston, the space situated above the piston of the check-valve communicating with the face of the check-valve which is submitted to the overpressure on its upstream face, to an opening controlled by a check-valve which opens towards the region of overpressure. Thus, when the shock absorber slackens after landing, the underpressure which occurs upstream from the check-valve of the shock absorber has for a result to remove from its seat the inner check-valve of the rod and to suck up the air or the gas which are in the closed chamber situated above the piston of the check-valve.

A fall of pressure is thus caused in the chamber so that while the airplane is rolling along on the ground, the check-valve of the shock absorber opens under application of a pressure equal to the calibration of the spring added to the pressure thus reduced. This pressure tends to increase progressively by the infiltration of air or gas through the compensation aperture. However, by the successive recoils which are close together, the underpressure is restored and even increased by the pumping effects corresponding to each way down of the valve of the shock absorber. It can thus be seen that by the means of this arrangement, the shock absorber according to the present invention presents a substantial resistance to the thrusting force of the movable member under the landing shock, and a substantially reduced resistance while the airplane is rolling along on the ground.

According to a preferred embodiment of the present invention, the diameter of the piston which is integral with the valve is equal to the diameter of the surface of the valve to which the overpressure is applied. The valve thus becomes completely free from the average pressure existing in the chamber toward which the valve opens. In some cases, however, it may be advantageous to let the average pressure of the chamber toward which the valve opens, act under determined conditions on the valve. For that purpose, a slightly smaller section can, in that case, be given to the piston, according to the operating conditions to be met, than that of the surface of the valve to which the overpressure is applied.

It will be realized that whichever may be the case elected of the three (diameter of the piston equal, slightly smaller or slightly larger than the diameter of the surface of the valve to which the overpressure is applied) the reduction of pressure above the piston integral with the valve will have for a result to reduce the resistance that this valve presents to the fluid during the thrusting in action of the shock absorber.

According to a second feature of the present invention, the decrease of the counter-pressure after landing is further increased by a complementary arrangement. According to this feature, the piston integral with the check-valve of the shock absorber is made integral with a second piston which slides in a closed chamber divided by this piston into two compartments communicating with each other by a compensating restricted aperture of small section, and a similar aperture provides for communication between the lower compartment and the surrounding space.

With this arrangement, this pumping effect has for a result to cause a drop of pressure above the piston, to which on its lower face the average pressure existing in the surrounding medium continues to be applied. Thence results a push on this second piston applied in the way opposite to the one due to the spring of this check-valve. By changing the diameter of this second piston, the opposing effect can be increased as required.

According to a third feature of the present invention, the desired effect can be still further increased by making the inside of the rod of the check-valve communicate with the space situated under the second piston of the check-valve by a hole controlled by a one-way check-valve opening towards the inside of this space. In that way, each suction of the gas or air situated above the second piston of the check-valve is followed by a driving back of these gases or of the air towards the space situated under this piston.

According to another feature of the present invention, instead of making the underpressure act directly on the check-valve to reduce the pressure above the second piston, inside the hollow rod is designed a piston urged towards the face of the check-valve submitted to the overpressure, for instance by a spring, and the stroke of which in that way is limited by controlled thrusts. At the time of the elongations of the shock absorber this piston makes, on its way down, an underpressure sucking the air or the gases which are above the second piston while, on its way back upwards, it drives back under this piston the said air or gases.

According to another feature of the present invention, the suction of the air or gas situated above the piston of the check-valve is increased by a device which makes a sudden vacuum in the lower part of the hollow rod of the check-valve. According to this feature, the hole of small section intended to balance the pressures between the two faces of the wall which divides the two chambers of the shock absorber is suppressed and instead are provided passages constructed in the body of the check-valve and controlled by a cap sliding along the rod of the check-valve and having a suitable shape and a determined stroke. Thus, when the shock absorber shortens, the overpressure makes the cap go upwards along the rod. Where the shock absorber slackens, the cap goes downwards and shuts the holes with a determined delay and suddenly, so that in the lower part of the rod a vacuum occurs which has for result to increase suddenly the sucking.

According to another feature of the present invention, it is intended to produce the underpressure above the piston of the check-valve only for substantial recoils. For that purpose, according to that feature, in the lower part of the rod of the check-valve is designed a parting wall bored with a hole in which can slide a small piston provided in its upper part with vertical peripheral grooves, this piston being maintained with elasticity in its upper position by suitable means. When an underpressure occurs upstream of the check-valve of the shock absorber, this piston goes down more or less according to the value of the underpressure and opens the communication with the inner part of the rod only from a determined amplitude.

It must be well understood that the present invention can be applied as well to shock absorbers of the pneumatic type, in which the two chambers are filled with air or gas—as to shock absorbers of the hydro-pneumatic type, and more specially, oleo-pneumatic in which one of the chambers is completely filled with oil or the like, while the other one is filled to a determined level with the same liquid, the remaining chamber being occupied by a suitable gas, such as air.

Besides, the means of communication between the two chambers can be constituted in any suitable way, being constituted for instance by the bottom of a hollow piston sliding in the cylinder, by a wall integral with the cylinder and engaging with a hollow piston open at its upper end and engaging with the lower end of a cylinder, or still by a fixed wall limiting a closed space constituted by the bottom of the cylinder, while a plain piston slides in the cylinder, defining between its face and the said wall a space of variable volume.

Any other system could besides be provided without parting for that from the idea of the present invention, and, specially, a system in which the spaces of volumes respectively constant and variable, communicate by suitable means.

In the case of shock absorbers of the type in which exists a relative movement between the parting wall between the two chambers and the walls of the space in which it is situated, the restoring of a pressure balance between the two chambers, allowing the thrusting in of the shock absorber can be assumed by a device of special construction which is also an object of the present invention, and this, whatever may be the type of shock absorber used.

According to this arrangement, the wall has a diameter smaller than the one of the inner part of the cylinder in which it slides and includes a piston ring constituted by a split ring, the ends of which are not in contact, assuring between them a passage for the fluid. This arrangement allows, in a very simple way, to change the section of the passage, instead of the needle device generally used. For it is sufficient to give the inner wall of the cylinder a profiled shape to change the section of passage according to the displacements of the wall separating the two chambers.

To make easier the shortening of the shock absorber, intended for instance to allow its retraction, it is also intended, according to the present invention, to provide in the means of communication between the spaces, a hole controlled by a check-valve, opening towards the variable volume space and submitted to the action of a spring which tends to remove it from its seat. When the piston moves slowly in the cylinder, the fluid can flow through that passage. When, on the contrary, the shock absorber retracts swiftly, the check-valve is shut, so that it does not operate at the landing nor during the rolling of the airplane on the ground.

According still to another feature of the present invention, it is designed to complete the shock absorber by another passage, provided in the means of communication between the chambers and intended to make easier the lengthening of the shock absorber after its sudden shortening due to the landing shock, intended to give it back into optimum properties in case of recoil of the airplane on the ground. For that purpose, according to the present invention, this passage is controlled by a check-valve opening towards the space of variable volume and urged towards its seat by a spring decreasing the recoil and the strength of which balances, for instance, the pressure corresponding to the weight of the airplane. In that way, the check-valve is normally shut but it opens under the heavy pressure established in the shock absorber after the landing shock and allows the fluid to flow towards the chamber of variable volume till the above-mentioned pressure is reached, at which time it shuts.

The invention will be better understood by the aid of the joined drawings on which have been represented as examples particular embodiments of the invention.

Figure 1:
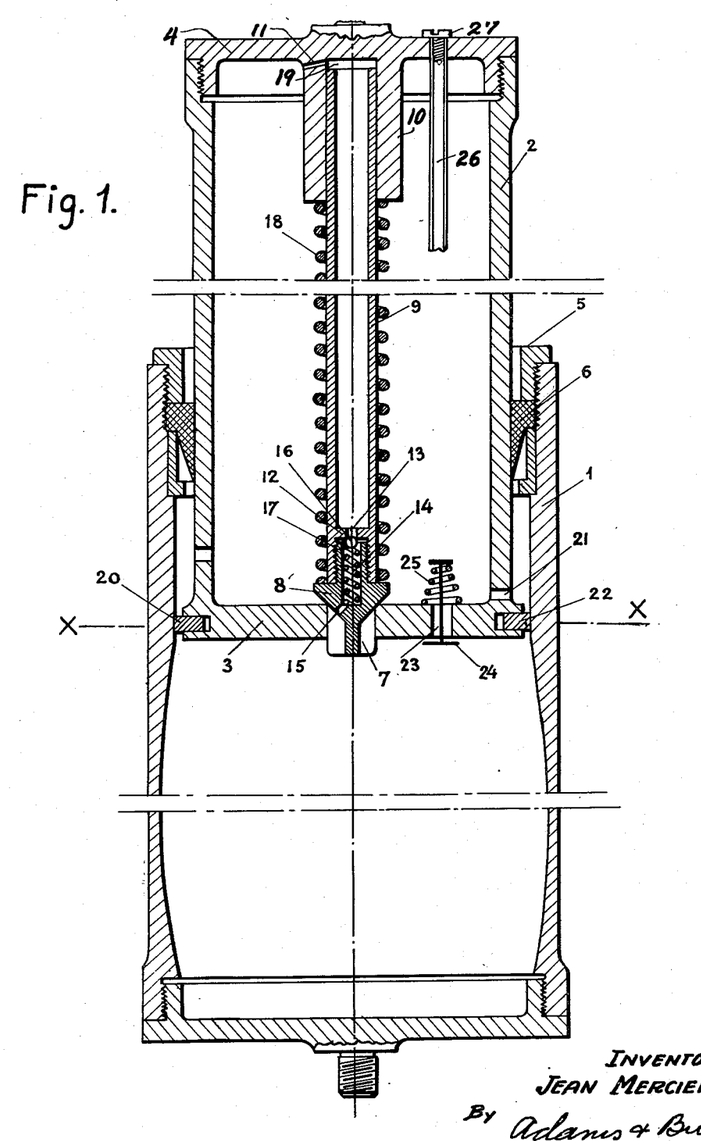
Fig. 1 is an axial section of a shock absorber according to the present invention.

Referring first to Fig. 1, at 1 is seen the cylinder of the shock absorber in which moves a hollow piston 2 constituting a closed chamber. The tightness between the piston and the cylinder is assumed in this example by the lining 6 and a ring constituting a nut 5.

In the embodiment of Fig. 1 the chamber of constant volume is constituted by the inside of the hollow piston 2 and the variable volume chamber by the bottom of cylinder 1, these two chambers being separated from each other by a wall 3 constituting the bottom of the hollow piston, this wall including the various means of communication between the two chambers.

The shock absorber of the type of Fig. 1 can be of the pneumatic or hydro-pneumatic type. It will be supposed for instance in the following description that the bottom of the cylinder and the inner part of the piston to a determined level is filled with oil, for instance, by pipe 26 (Fig. 1) provided with a shutting device 27, the upper part of piston 2 being occupied by gas such as air. The piston is shut at its upper part, for instance by a screwed lid 4. The means of communication between the two spaces include as said above at least one passage controlled by a check-valve submitted to the pressure of a calibrated spring. This passage is shown at 7, the check-valve at 8 and the spring at 18. The rod of the check-valve is hollow as seen at 9, its upper end constituting a piston sliding in a cylinder 10 constituted in the shown example at lid 4 of piston 2, this cylinder communicating by a passage of small section 11 with the upper part of the inner space of piston 2. In the lower end of the hollow rod 9 is provided a wall 12 bored with a hole 13. The inner part of check-valve 8 screwed in the lower part of rod 9 constitutes a chamber 14 communicating with the face of the check-valve by holes 15. Inside this chamber is a ball 16 applied against the edge of hole 13 by a spring 17. In that way when the piston thrusts in the cylinder at the landing shock, check-valve 8 is removed from its seat, the pressure due to the landing shock overcoming the pressure of spring 18 added to the pressure of the air existing in the upper part of the piston and consequently in chamber 19 situated above rod 9 and inside this rod. During the first recoilings of the airplane when check-valve 8 comes back on its seat, the underpressure existing then under face 3 of the piston causes a suction which removes ball 16 from its seat and which sucks the air which is inside rod 9 of chamber 19. In that way, during the thrustings in of the piston, determined by the roughness of the ground on which the airplane rolls, the pressure the check valve will have to overcome is no more the sum of the calibration of spring 18 and of the air pressure in the upper part of the piston, but the calibration of the piston added to the reduced pressure existing in chamber 9 and 19. As it has been said above, this pressure is maintained and even increased during the rolling along the ground by the fact that the slow infiltration of air through passage 11 is largely balanced by the successive suctions of air through the lower end of the rod during the successive reboundings.

In Fig. 1 has been represented also, as an example, a balancing device of pressure between the two faces of the piston established according to a feature of the invention and taking the place of the usual hole generally controlled by a needle. According to that arrangement, the diameter of bottom 3 of the piston is smaller than the one of the inner wall of cylinder 1 and is provided with a piston ring 20 constituted by a split ring the ends of which are not in contact (see also Fig. 3). Besides, the lower wall of the cylinder has an inner shape suitably profiled. The space situated above ring 20 communicates with the inner part of the piston by passages 21. In that way the communication between the two faces of the piston is assumed by passages 21 and variable section passages 22 provided between the two ends of ring 20, passage which varies during the displacements of the piston in the cylinder. As it has been said above, it must be well understood that the invention is not limited to the use of that device and that, besides, it concerns in a special way, and independently from any application to any shock absorber of a given type, the said device in itself.

In Fig. 1 has been also represented an arrangement according to another feature of the invention and which can be used in some cases and this as well in shock absorbers of the described type as in any other shock absorber of a similar type, the invention concerning also this arrangement in itself, independently from any special application.

This arrangement consists in the providing in bottom 3 of the piston a complementary hole 23 provided with a check-valve 24 opening downwards and urged towards its shutting position by a spring 25. According to a preferred embodiment, this spring is calculated so as to shut the check-valve when the pressure inside the piston corresponds to the one which is determined by the action on the shock absorber of the weight of the airplane, in such a way that this check-valve opens when the pressure overcomes the spring. Thus when the shock absorber shortens consequently to the landing shock which increase the pressure inside the shock absorber, this one can quickly lengthen as soon as the airplane has recoiled by the fact that the pressure opens check-valve 24, this check-valve being shut only when the pressure has lowered to the value corresponding to the spring.

Figure 2:
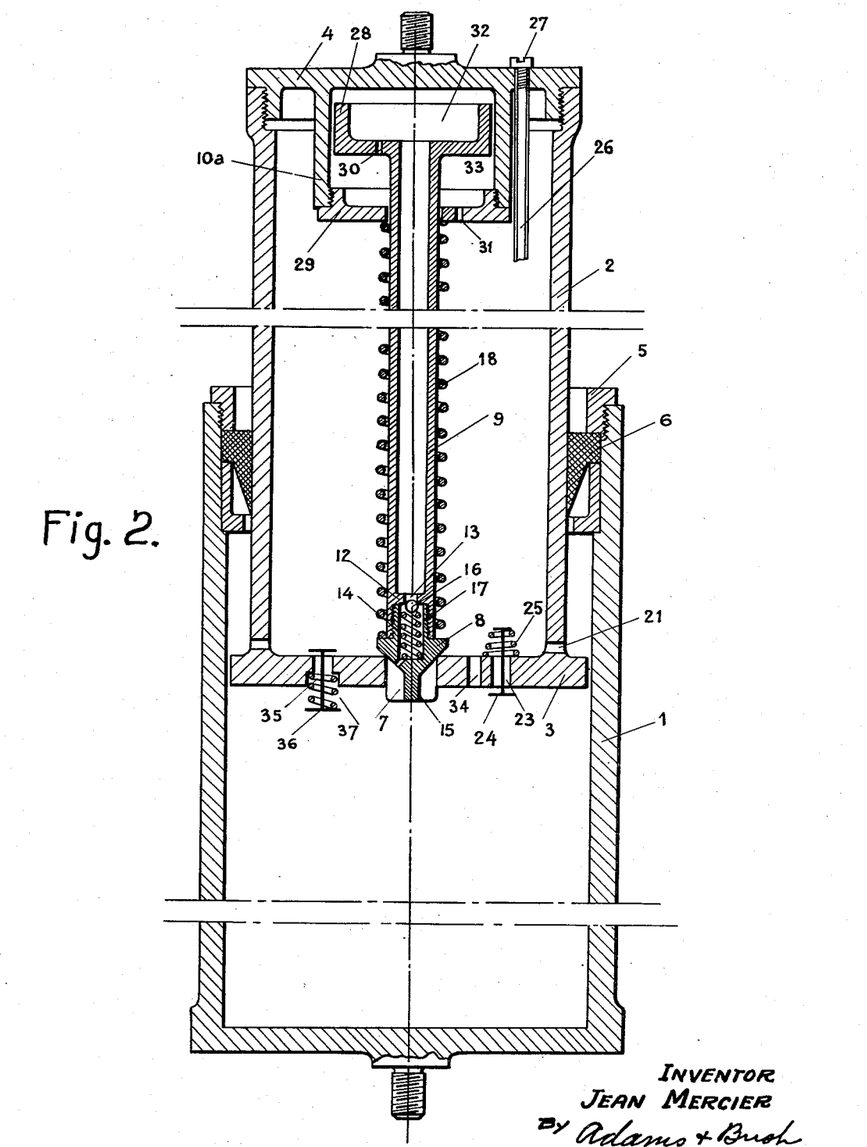
Fig. 2 is a similar view of a more elaborate embodiment of the shock absorber of Fig. 1.

In Fig. 2 has been represented a shock absorber of the same type as the one of Fig. 1 but including a few modifications of that figure, the same members are at the same reference numbers. In the example of Fig. 2, the shock absorber is provided with an arrangement constituting another feature of the invention allowing to develop an opposing force to the spring 18 while the airplane is rolling along the ground. According to that arrangement, the end of hollow rod 9 includes a part of larger diameter 28 constituting a second piston and engaging with a cylindrical part 10a of lid 4, the height of this cylindrical part being somewhat longer than that of the second piston 28 and being closed by a lower lid 29. Piston 28 is bored with a hole 30 and lid 29 with a hole 31. With that arrangement, when the check-valve and the rod go down, a suction downwards still exists, determined by the underpressure which acts on ball 16 through holes 15. This underpressure occurs in chamber 32 constituted between the second piston of rod 9 and the upper part of cylindrical chamber 10a. On the contrary, in space 33 situated between the bottom of piston 28 and lid 29 continues to exist a pressure equal to that existing in the shock absorber. Thence a push upwards applied on the whole of the annular section of part 28 situated between the inner periphery of rod 9 and the inner periphery of cylinder 10a. It can, therefore, be seen that the shock absorber becomes still more yielding than the one of Fig. 1 while the airplane rolls along the ground, though keeping the same stiffness during the landing shock.

In the example of Fig. 2, wall 3 is bored with a hole of small section 34, taking the place of devices 20, 21, 22 of Fig. 1. This shock absorber includes also the device 23—24—25 intended to make easier the quick lengthening of the damper immediately after the first recoil following the landing shock. Also, there has been provided in that example a fourth passage intended to make easier the controlled shortening of the shock absorber having for instance for its purpose to precede its retraction.

This device is constituted by a passage 35 provided with a check-valve 36 submitted to the action of a compressing spring 37 which tends to remove it from its seat. During the quick displacements of the piston towards the bottom of the cylinder, due to the landing shock as well as to the shocks resulting from the roughness of the ground while the airplane is rolling along it, check-valve 36 shuts, but on the contrary it remains opened when a slow thrusting of the piston in the cylinder is caused.

It must be well understood that the use of this device is optional and that besides, this latter can be applied as well in the case of the shock absorber of Fig. 1 as in the one of the shock absorber of Fig. 2 and in a general way in any hydraulic or hydro-pneumatic shock absorber.

Figure 4:
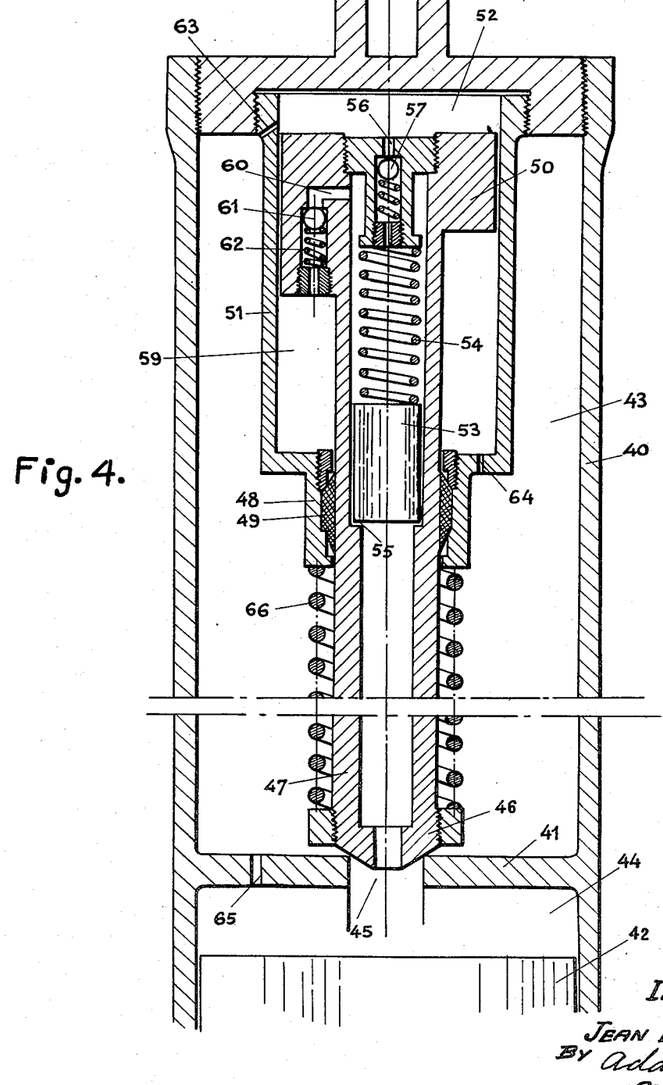
Fig. 4 shows a shock absorber of a modified form.

In the example of Fig. 4 has been represented a shock absorber of a different construction including also an application of the present invention. In that example, the shock absorber is constituted by a cylinder 40 presenting a transversal wall 41 and receiving a piston 42 which slides in its lower part. The chamber of constant volume is constituted in that case by space 43 situated above wall 41 and the variable volume space by the space situated between the wall and piston 42. In wall 41 is bored a hole 45 closed by a check-valve 46 and submitted to the pressure of a spring 66, the rod 47 of which is hollow. In that example, the outer diameter of the rod is slightly larger than the diameter of the section of the check-valve submitted to the overpressure, so that the pressure existing in the chamber of constant volume interferes under determined conditions in the resistance which opposes the opening of the check-valve. It must, however, be well understood that this arrangement has been given only for an example and that it is easy, if desired, to give the outer diameter of rod 47 the same value as the one of the section of check-valve 46 submitted to the overpressure in order to avoid any influence on the check-valve of the pressure existing in the chamber of constant volume 43.

In the example of Fig. 4, rod 47 constituting a piston slides in a cylindrical part 48 which can include, if desired, means of guiding such as 49 constituting a tight joint. The upper part of rod 47 carries a piston 50 sliding in a cylinder 51. In the building of Fig. 4, the inner space of the rod does not communicate with the space situated in chamber 52 which is situated above piston 50, a piston 53 being arranged inside the rod. This piston is urged downwards by a spring 54, its stroke downwards being limited by a shoulder 55. The communication between the upper part of rod 47 and space 52 is provided by a hole 56 controlled by a ball 57 submitted to the action of a spring 58. This space communicates with chamber 59 situated under piston 50 by a hole 60 controlled by a ball 61 submitted to the action of a spring 62. With that disposition, when check-valve 46 goes down during the recoils of the airplane on the ground, the displacements downwards of piston 53 cause the suction of the air which is in chamber 52. On the contrary, the displacements upwards under the effect of the overpressure cause the driving back of that air in chamber 59. A substantial underpressure can thus be attained in chamber 52, an overpressure in chamber 59. Compensation holes 63 and 64 assure the balancing back of the pressure of chambers 52 and 59 when the shock absorber is at rest. Wall 41 can include any other passage controlled in a suitable way, for instance of the type represented in Figs. 1 and 2. In the example of Fig. 4 has been only represented a simple hole balancing of the pressure 65.

Figure 5:
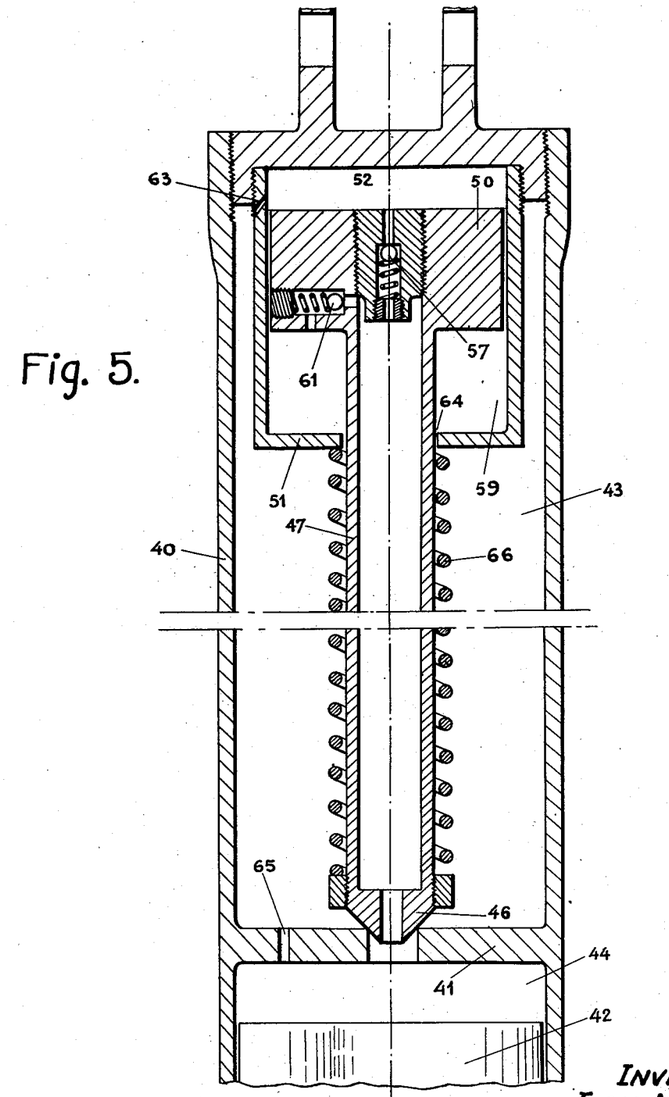
Fig. 5 shows a different modification of the shock absorber shown in Fig. 4.

In Fig. 5 has been represented a shock absorber of the same type as the one represented in Fig. 4, the same members being designated by the same reference numbers. The shock absorber of Fig. 5 differs from the one Fig. 4 only by the fact that piston 53 is omitted and that rod 47 of check-valve 46 communicates directly with space 52 situated above piston 50 through a one-way check-valve 57 and with space 59 situated under that piston through a one-way check-valve 61.

Figures 3, 6, 7, 8:
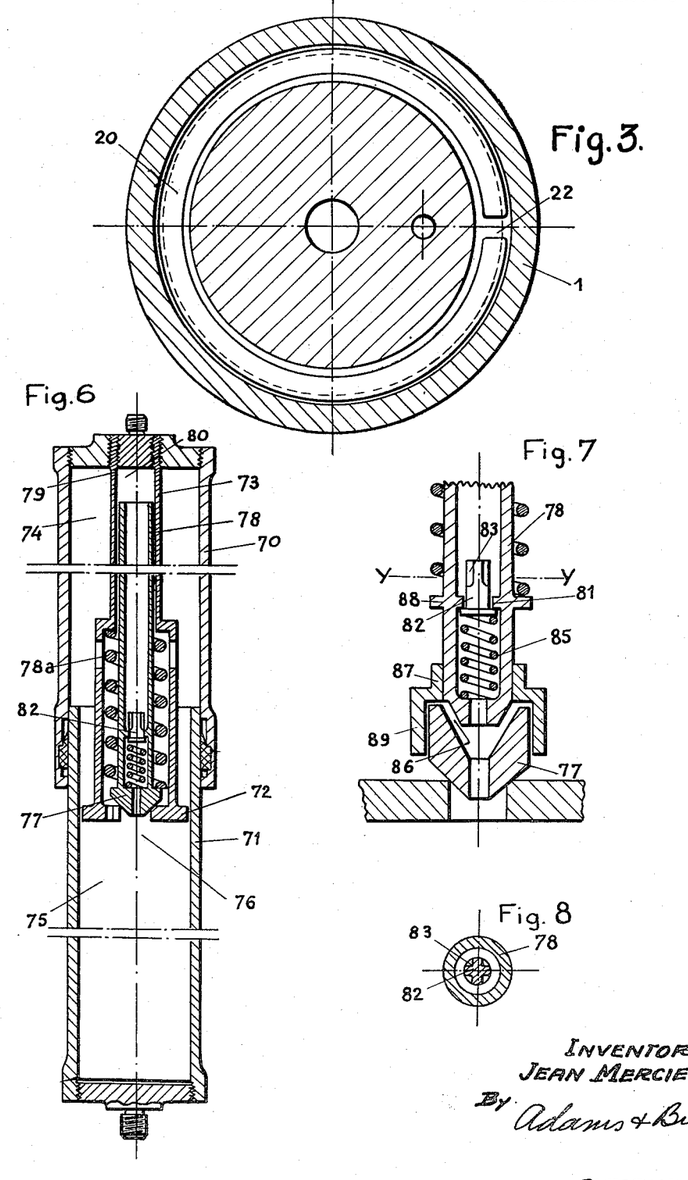
Fig. 3 is a section on the X—X axis of Fig. 1.
Fig. 6 shows a shock absorber of still another type.
Fig. 7 is a detail view showing another modification.
Fig. 8 is a section on the Y—Y axis of Fig. 7.

In Fig. 6 has been represented a shock absorber of a third type including also application of the present invention. In that example, in the cylinder 70 of the shock absorber slides a hollow piston 71, a wall 72 carried by an arrangement 73 integral with cylinder 70 constituting the parting between the two chambers of the shock absorber, the space 74 situated above wall 72 constituting the constant volume chamber, and the space 75 situated under this wall, the variable volume chamber. The hole 76, bored in wall 72, is controlled by a check-valve 77 the hollow rod 78 of which slides in a cylinder 73, a spring 78a applying the check-valve on its seat. In 79 is seen the hole of small section making communicate space 80 (situated under rod 78 acting as a piston) and chamber 74.

In Fig. 6 has been represented besides a complementary device constituting another feature of the invention. This device has for purpose to determine a decrease of the pressure above rod 78 of the check-valve only for the rather substantial recoils of the airplane. For that purpose a wall of parting 81 is provided in the lower part of rod 78, and bored with an axial hole in which slides a small piston 82, the upper part of which includes vertical peripheral grooves 83 (see also Figs. 7 and 8 in which are seen the same members on a bigger scale). The piston 82 is maintained in the closed position by a spring 85. Thus, when check-valve 77 goes down, piston 82 is urged by the underpressure which exists upstream the check-valve from top to bottom, but it establishes the communication between the two parts of the rod situated above and under wall 81, respectively, only when piston 82 has moved a determined amount.

In Figs. 7 and 8 have been represented, as it has just been said, the device with delayed action shown in Fig. 6. Besides in Fig. 7 is seen another arrangement characteristic of the invention. This arrangement has for its purpose to cause a sudden suction inside the rod. According to that feature, the body of the check-valve is provided with passages 86 establishing a communication between its inside and the chamber downstream the check-valve; these passages being controlled by a cap 87 which can slide along rod 78 of the check-valve, its stroke upwards being limited by a thrust 88. Cap 87 presents a vertical edge 59. In that way, when an overpressure occurs upstream check-valve 77, cap 87—89 goes up along rod 78 of the check-valve and uncovers holes 86. On the contrary, when the check-valve goes down, cap 87—89 goes also down and determines the shutting of holes 86 with a determined delay and suddenly. Then is created under the inner chamber of the rod a substantial underpressure which has for a result to give rise to an increased suction intended to act on the one-way check-valve which controls the communication between the inside of the rod and the space situated above it.

It will be well understood that the arrangement which has just been described is by no means limited to its use with a check-valve with delayed action of the type represented in Fig. 7 and that, in a more general way, the various arrangements characteristic of the invention which have been represented on the different figures are by no means limited to the use with the type of shock absorber represented on this figure and that for instance the device of Fig. 7 can be used on a shock absorber represented in Figs. 1, 2, 4 and 5, as well as check-valves 24 and 36 can be used with shock absorbers of the type represented in Figs. 4, 5 and 6, etc.

It must also be well understood that the type of the shock absorbers, their sizes, shapes, building, etc., to which the different devices of the present invention are applied can be of any type.

I claim:

1. In a telescoping fluid shock absorber, a principal cylinder, closed at one end, a hollow principal piston slidably mounted in said cylinder and having closing end walls, said cylinder and said piston being adapted to contain fluid, the inner end wall of said piston nearest the closed end of said cylinder being apertured to provide a small communicating passage therethrough, one-way valve means mounted for closing said passage and comprising resilient means normally urging said valve means into closed position, a hollow valve stem within said hollow piston for displaceably mounting said valve means, said valve stem being provided with a small aperture defining a restricted communication channel between the interior of said valve stem and the exposed face of said valve means engageable to close said aperture in said end wall of said principal piston, a secondary cylinder closed at both ends, mounted within the interior of said hollow piston at its end opposite said valve means, a secondary piston shell open at one end and closed at the other end and being slidably mounted within said secondary cylinder and having a closing terminal mounting wall whereby it is mounted on an end of said valve stem, one end wall of said secondary cylinder being apertured for slidably receiving said valve stem, and said terminal mounting wall being further provided with a small aperture providing communication between the interior of said secondary piston shell and the interior of said secondary cylinder on the mounting stem side of said mounting wall, the wall of said secondary cylinder being provided with a restricted aperture providing communication between the portion of the interior of said secondary cylinder nearest the end of said valve stem carrying said valve means, and the interior of said principal piston.

2. In a telescoping fluid shock absorber, a principal cylinder adapted to contain fluid and divided by a transversal wall having a valve seat into a first chamber and a second chamber, a piston slidable within said first chamber, a secondary cylinder mounted within said second chamber, integral with the end wall of said second chamber remotest from said transversal wall and whose end wall nearest said transversal wall is apertured, a valve stem slidably mounted through said apertured end wall of said auxiliary cylinder, said valve stem being provided, at its end remotest from said transversal wall, with a piston slidable within said secondary cylinder and, at its end nearest said transversal wall, with a first apertured valve means, adapted to be pressed against said valve seat, resilient means for normally urging said valve stem from said auxiliary cylinder against said valve seat, an auxiliary piston slidably mounted within said hollow valve stem, auxiliary resilient means normally urging said auxiliary piston against a seat in the inner peripheral wall of said valve stem, a second valve means providing a restricted communication between the portion of the interior of said valve stem above the end of said auxiliary piston remote from said seat, and the portion of the interior of said secondary cylinder remote from the end of said valve stem carrying said second valve means, a third valve means providing a restricted communication between the portion of the interior of said valve stem above the end of said auxiliary piston remote from said seat, and the portion of the interior of said secondary cylinder nearest the end of said valve stem carrying said second valve means.

3. In a telescoping fluid shock absorber, a principal cylinder, closed at one end, a hollow principal piston slidably mounted in said cylinder and having closing end walls, said cylinder and said piston being adapted to contain fluid, the inner end wall of said piston nearest the closed end of said cylinder being apertured to provide a small communicating passage therethrough, one-way valve means mounted for closing said passage and comprising resilient means normally urging said valve means into closed position, a secondary cylinder, mounted within the interior of said hollow piston at its end opposite said valve means, a hollow valve stem within said hollow piston, being slidably mounted within said secondary cylinder, for displaceably mounting said valve means, and provided with a small aperture defining a restricted communication channel between the interior of said valve stem and the exposed face of said valve means, said secondary cylinder being provided with a small aperture defining a communicating channel between the interior of said secondary cylinder and the interior of said principal piston.

4. In a fluid shock absorber, a variable-volume chamber, a constant-volume chamber, a wall provided with a valve seat for separating said chambers, a cylindrical chamber made integral with said constant-volume chamber and open at its end facing said wall, valve means mounted within said constant-volume chamber, the front part of said valve means being adapted to close said valve seat and the back part of said valve means being slidably mounted within said cylindrical chamber, a spring normally urging said front part of said valve means against said valve seat, and means for lowering the pressure obtaining within said cylindrical chamber when the pressure obtaining within said variable-volume chamber is decreasing and for withstanding the increase of pressure within said cylindrical chamber when the pressure within said variable-volume chamber is increasing.

5. In a telescoping fluid shock absorber, a principal cylinder adapted to contain fluid and divided by a transversal wall having a valve seat into a first chamber and a second chamber, a piston slidable within said first chamber, a secondary cylinder mounted within said second chamber, integral with the end wall of said second chamber remotest from said transversal wall and whose end wall nearest said transversal wall is apertured, a valve stem slidably mounted through said apertured end wall of said secondary cylinder, said valve stem being provided at its end remotest from said transversal wall, with a piston slidable within said secondary cylinder and at its end nearest said transversal wall with a first apertured valve means, adapted to be pressed against said valve seat, resilient means for normally urging said valve stem from said auxiliary cylinder against said valve seat, a second valve means providing a restricted communication between the portion of the interior of said valve stem remote from said transversal wall, and the portion of the interior of said secondary cylinder remote from said transversal wall, and a third valve means providing a restricted communication between the portion of the interior of said valve stem remote from said transversal wall, and the portion of the interior of said secondary cylinder nearest said transversal wall.

JEAN MERCIER.

REFERENCES CITED

The following references are of record in the file of this patent:

UNITED STATES PATENTS

| Number | Name | Date |
|---|---|---|
| 2,155,605 | Levy | Apr. 25, 1939 |
| 2,186,011 | De Port | Jan. 9, 1940 |
| 2,333,096 | Dowty | Nov. 2, 1943 |

FOREIGN PATENTS

| Number | Country | Date |
|---|---|---|
| 408,592 | Great Britain | Apr. 5, 1934 |
| 826,293 | France | Mar. 28, 1938 |